(12) United States Patent
Wilson et al.

(10) Patent No.: US 7,605,117 B2
(45) Date of Patent: Oct. 20, 2009

(54) METHODS OF REPLACING REFRIGERANT

(75) Inventors: David P. Wilson, East Amherst, NY (US); Hang T. Pham, Amherst, NY (US); Rajiv R. Singh, Getzville, NY (US); Raymond H. Thomas, Pendleton, NY (US); David Nalewajek, West Seneca, NY (US)

(73) Assignee: Honeywell International Inc., Morristown, NJ (US)

( * ) Notice: Subject to any disclaimer, the term of this patent is extended or adjusted under 35 U.S.C. 154(b) by 256 days.

(21) Appl. No.: 11/109,190

(22) Filed: Apr. 18, 2005

(65) Prior Publication Data

US 2006/0022166 A1 Feb. 2, 2006

Related U.S. Application Data

(63) Continuation-in-part of application No. 10/826,811, filed on Apr. 16, 2004, now Pat. No. 7,413,674, and a continuation-in-part of application No. 10/826,072, filed on Apr. 16, 2004, now Pat. No. 7,074,751, and a continuation-in-part of application No. 10/826,727, filed on Apr. 16, 2004, now abandoned, and a continuation-in-part of application No. 10/826,592, filed on Apr. 16, 2004, now Pat. No. 6,969,701, and a continuation-in-part of application No. 10/826,597, filed on Apr. 16, 2004, now Pat. No. 7,098,176.

(60) Provisional application No. 60/563,085, filed on Apr. 16, 2004.

(51) Int. Cl.
C11D 7/50 (2006.01)

(52) U.S. Cl. .................. 510/408; 510/412; 510/415; 252/67

(58) Field of Classification Search .............. 510/408, 510/412, 415; 252/67
See application file for complete search history.

(56) References Cited

U.S. PATENT DOCUMENTS

| 2,834,748 | A |  | 5/1958 | Bailey et al. |  |
|---|---|---|---|---|---|
| 2,846,458 | A |  | 8/1958 | Haluska et al. |  |
| 2,889,379 | A |  | 6/1959 | Ruh et al. |  |
| 2,917,480 | A |  | 12/1959 | Bailey et al. |  |
| 4,465,786 | A |  | 8/1984 | Zimmer et al. |  |
| 4,798,818 | A |  | 1/1989 | Baizer et al. |  |
| 5,182,040 | A |  | 1/1993 | Bartlett et al. |  |
| 5,380,449 | A | * | 1/1995 | Thomas et al. | 252/68 |
| 5,478,905 | A | * | 12/1995 | Anolick et al. | 526/254 |
| 5,611,210 | A | * | 3/1997 | Nimitz et al. | 62/114 |
| 5,648,017 | A | * | 7/1997 | Bartlett et al. | 252/67 |
| 5,679,875 | A | * | 10/1997 | Aoyama et al. | 570/156 |
| 5,716,549 | A | * | 2/1998 | Nimitz et al. | 252/364 |
| 6,516,837 | B2 |  | 2/2003 | Thomas et al. |  |
| 6,858,571 | B2 | * | 2/2005 | Pham et al. | 510/408 |
| 6,969,701 | B2 | * | 11/2005 | Singh et al. | 510/412 |
| 7,098,176 | B2 | * | 8/2006 | Singh et al. | 510/408 |
| 7,279,451 | B2 | * | 10/2007 | Singh et al. | 510/412 |
| 7,341,984 | B2 | * | 3/2008 | Wilson et al. | 510/408 |

FOREIGN PATENT DOCUMENTS

| EP | 0 974 571 | 1/2000 |
|---|---|---|
| JP | 4323294 | 11/1992 |
| JP | 8277389 | 10/1996 |
| JP | 11140002 A | 10/1996 |
| JP | 9059609 | 3/1997 |
| JP | 4323294 | 6/2000 |
| JP | 2000178543 | 6/2000 |
| JP | 2000309789 | 11/2000 |
| WO | WO 97/15637 | 5/1997 |
| WO | WO 98/37043 | 8/1998 |
| WO | WO 99/48993 | 9/1999 |
| WO | WO 00/39242 | 7/2000 |
| WO | WO 02/059231 | 8/2002 |
| WO | WO 2005/103191 | 11/2005 |

* cited by examiner

*Primary Examiner*—Gregory E Webb
(74) *Attorney, Agent, or Firm*—Colleen D. Szuch

(57) ABSTRACT

Provided are azeotrope-like compositions comprising tetrafluoropropene and pentafluoropropene and uses thereof, including use in refrigerant compositions, blowing agent compositions, foamable compositions, foams, sterilant compositions, sprayable compositions, and systems and methods using same.

20 Claims, No Drawings

METHODS OF REPLACING REFRIGERANT

CROSS-REFERENCES TO RELATED APPLICATIONS

The present application is a Continuation in Part of each of U.S. application Ser. Nos. 10/826,811 (now U.S. Pat. No. 7,413,674), 10/826,072 (now U.S. Pat. No. 7,074,751), 10/826,727 (now abandoned), 10/826,592 (now U.S. Pat. No. 6,969,701) and 10/826,597 (now U.S. Pat. No. 7,098,176), all of which were filed on Apr. 16, 2004. The present application is also related to and claims the priority benefit of U.S. Provisional Patent Application Ser. No. 60/563,085 (now expired) filed Apr. 16, 2004. The disclosures of all six applications are incorporated herein by reference.

Also incorporated herein by reference are each of U.S. application Ser. Nos. 11/109,575, 11/109,195 (now U.S. Pat. No. 7,479,477), 11/109,188 (now U.S. Pat. No. 7,465,698), 11/109,187 (now U.S. Pat. No. 7,341,984), and 11/109,189, all of which were filed concurrently with this application.

FIELD OF INVENTION

The present invention provides azeotrope-like compositions of 1,1,1,2-tetrafluoropropene and the Z-isomer of 1,1,1,2,3-pentafluoropropene, and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential, such as hydrofluorocarbons ("HFCs"). Thus, the use of fluids that do not contain chlorofluorocarbons ("CFCs") or hydrochlorofluorocarbons ("HCFCs") is desirable. Additionally, the use of single component fluids or azeotropic mixtures, which do not fractionate on boiling and evaporation, is desirable. Furthermore, some HFC fluids may have relatively high global warming potentials associated therewith, and it is desirable to use hydrofluorocarbon or other fluorinated fluids having as low global warming potentials as possible while maintaining the desired performance in use properties. Additionally, the use of single component fluids or azeotrope-like mixtures, which do not substantially fractionate on boiling and evaporation, is desirable. However, the identification of new, environmentally-safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs. Of particular interest are mixtures containing both hydrofluorocarbons and other fluorinated compounds, both of low ozone depletion potentials. Such mixtures and their uses are the subject of this invention.

DESCRIPTION OF PREFERRED EMBODIMENTS

The present inventors have developed several compositions that help to satisfy the continuing need for alternatives to CFCs and HCFCs. According to certain embodiments, the present invention provides azeotrope-like compositions comprising 1,1,1,2-tetrafluoropropene ("HFO-1234yf") and (Z)-1,1,1,2,3-pentafluoropropene ("HFO-1225yeZ").

The preferred compositions of the invention tend both to be non-flammable and to exhibit relatively low global warming potentials ("GWPs") preferably less than about 1000, more preferably less than about 500, and even more preferably less than about 150. Accordingly, applicants have recognized that such compositions can be used to great advantage in a number of applications, including as replacements for CFCs, such as dichlorodifluormethane (CFC-12), HCFCs, such as chlorodifluoromethane (HCFC-22), HFCs, such as tetrafluoroethane (HFC-134a), and combinations of HFCs and CFCs, such as the combination of CFC-12 and 1,1-difluorethane (HFC-152a) (the combination CFC-12:HFC-152a in a 73.8:26.2 mass ratio being known as R-500) in refrigerant, aerosol, and other applications.

Additionally, applicants have recognized surprisingly that azeotrope-like compositions of HFO-1234yf and HFO-1225yeZ can be formed. Accordingly, in other embodiments, the present invention provides methods of producing an azeotrope-like composition comprising combining HFO-1234ze and HFO-1225yeZ in amounts effective to produce an azeotrope-like composition.

In addition, applicants have recognized that the azeotrope-like compositions of the present invention exhibits properties that make that make them advantageous for use as, or in, refrigerant compositions. Accordingly, in yet other embodiments, the present invention provides refrigerant compositions comprising an azeotrope-like composition of HFO-1234yf and HFO-1225yeZ. The term "HFO-1234" is used herein to refer to all tetrafluoropropenes. Among the tetrafluoropropenes are included HFO-1234yf and both cis- and trans-1,1,1,3-pentafluoropropene (HFO-1234ze). Likewise, the term "HFO-1225" is used herein to refer to all pentafluoropropenes. Among the pentafluoropropenes are included (Z)-1,1,1,2,3-pentafluoropropenee (HFO-1225yeZ).

Although the properties of the isomers of each of HFO-1234 and HFO-1225 differ in at least some respects, and while the present azeotrope-like compositions are based mainly on HFO-1234yf and HFO-1225yeZ, it is contemplated that the the various other isomers may be may be present in certain embodiments in amounts which do not negate the essential nature of the azeotrope-like composition.

HFO-1234 compounds are known materials and are listed in Chemical Abstracts databases. The production of fluoropropenes such as $CF_3CH=CH_2$ by catalytic vapor phase fluorination of various saturated and unsaturated halogen-containing $C_3$ compounds is described in U.S. Pat. Nos. 2,889,379; 4,798,818 and 4,465,786, each of which is incorporated herein by reference. EP 974,571, also incorporated herein by reference, discloses the preparation of 1,1,1,3-tetrafluoropropene by contacting 1,1,1,3,3-pentafluoropropane (HFC-245fa) in the vapor phase with a chromium-based catalyst at elevated temperature, or in the liquid phase with an alcoholic solution of KOH, NaOH, $Ca(OH)_2$ or $Mg(OH)_2$. In addition, methods for producing compounds in accordance with the present invention are described generally in connection with pending United States Patent Application entitled "Process for Producing Fluoropropenes" bearing which is also incorporated herein by reference.

In addition, applicants have recognized that the azeotrope-like compositions of the present invention exhibits properties that make that make them advantageous for use as, or in, numerous applications, including as heat transfer compositions (including as refrigerants in automotive air conditioning and heat pump systems, and in stationary air conditioning and refrigeration systems), blowing agents, propellants and sterilizing agents. Accordingly, in yet other embodiments, the present invention provides compositions and methods associated with these and other uses.

Azeotrope-like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

The azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well-recognized in the art that it is not possible to predict the formation of azeotropes. (See, for example, U.S. Pat. No. 5,648,017 (column 3, lines 64-65) and U.S. Pat. No. 5,182,040 (column 3, lines 62-63), both of which are incorporated herein by reference). Applicants have discovered unexpectedly that HFO-1234ze and $CF_3I$ form azeotrope-like compositions.

According to certain preferred embodiments, the azeotrope-like compositions of the present invention comprise, and preferably consist essentially of, effective azeotrope-like amounts of HFO-1234yf and HFO-1225yeZ. The term "effective azeotrope-like amounts" as used herein refers to the amount of each component which upon combination with the other component, results in the formation of an azeotrope-like composition of the present invention. Preferably, the present azeotrope-like compositions comprise, and preferably consist essentially of, from about 50 to less than 100 weight percent HFO-1234yf and from greater than zero to about 50 weight percent of HFO-1225yeZ. More preferably, the azeotrope-like compositions comprise, and preferably consist essentially of, from about 65 to less than 100 weight percent HFO-1234yf and from greater than zero to about 35 weight percent of HFO-1225yeZ, more preferably from about 85 to less than 100 weight percent HFO-1234yf and from greater than zero to about 15 weight percent of HFO-1225yeZ, and even more preferably from about 93 to less than 100 weight percent HFO-1234yf and from greater than zero to about 7 weight percent of HFO-1225yeZ. Unless otherwise indicated, the weight percents disclosed herein are based on the total weight of HFO-1225yeZ and HFO-1234yf in a composition.

The azeotrope-like compositions described herein preferably have a boiling point of from about −26° C. to about −30° C. at a pressure of about 14.2 psia. In certain more preferred embodiments, the present azeotrope-like compositions have a boiling point of from about −27° C. to about −30° C. at a pressure of about 14.2 psia, and in even more preferred embodiments, from about −28° C. to about −29.5° C. at a pressure of about 14.2 psia.

The azeotrope-like compositions of the present invention can be produced by combining effective azeotrope-like amounts of HFO-1234yf and HFO-1225yeZ. Any of a wide variety of methods known in the art for combining two or more components to form a composition can be adapted for use in the present methods to produce an azeotrope-like composition. For example, HFO-1234yf and HFO-1225yeZ can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Composition Additives

The azeotrope-like compositions of the present invention may further include any of a variety of optional additives including lubricants, stabilizers, metal passivators, corrosion inhibitors, flammability suppressants, and the like.

According to certain embodiments, the azeotrope-like compositions of the present invention further comprise a stabilizer. Any of a variety of compounds suitable for stabilizing an azeotrope-like composition of the present invention may be used. Examples of certain preferred stabilizers include stabilizer compositions comprising stabilizing diene-based compounds, and/or phenol compounds, and/or epoxides selected from the group consisting of aromatic epoxides, alkyl epoxides, alkenyl epoxides, and combinations of two or more thereof.

As the term is used herein, "diene-based compound" refers to C3-C5 dienes and to compounds formed by reaction of any two or more C3-C5 dienes. In the case of diene-based compounds which are formed by a combination of C3-C5 dienes, the molecules which are combined can be the same or different. Certain of the preferred compositions comprise at least one diene-based compound in an amount effective under conditions of use to stabilize the iodocarbon against degradation. The type and nature of the diene-based compound(s) to be used may depend, to at least some degree, upon the particular iodocarbon compound(s) being used in the composition, the expected conditions of use of the compositions, and related factors.

It is generally contemplated that the amount of the diene-based stabilizer used in the compositions of the present invention can vary widely, depending upon factors such as the type and amount of compounds in the composition which may undergo degredation of conversion under the expected conditions of storage and/or use, such as may be the case, for example, in composition which include iodocarbon compounds, such as $CF_3I$. In general, it is preferred to use diene-based stabilizer in an effective amount relative to the amount of such compounds being used or intended for use in the composition. As used herein, the term "effective amount" refers to an amount of diene-based compound(s) which, when added to a composition comprising the relevant compound, such as trifluoroiodomethane, results in a stabilized composition wherein the compound degrades more slowly and/or to lesser degree relative to the same composition, under the same, or similar, conditions, but in the absence of the diene-based compounds. In the particular example of trifluoroiodomethane, one of the important potential breakdown products under certain severe conditions is trifluoromethane, which is formed by the substitution of hydrogen for iodine in the $CF_3I$ molecule. Similarly, hydrogen can be substituted for iodine in other iodocarbons, thereby forming compounds that can have GWP values greater than 150. These breakdown products have the effect of raising the GWP of the refrigerant blends that use iodocarbons. The goal of having a low global warming potential is therefore defeated. An effective amount of stabilizer will reduce the amount of decomposition of the compound, particularly, iodocarbon such that the GWP of the refrigerant composition is below 150. Even without the consideration of GWP values, breakdown of a component of a refrigerant composition is undesirable. Thus it is preferred that the level of the breakdown product described above be less than 1.0 wt. % of the total refrigerant composition. In certain preferred embodiments, the amount of the diene-based compound(s) is sufficient to result in a stabilized composition wherein at least one of the degradable compounds, such as iodocarbon compound(s), therein degrades more slowly and/or to a lesser degree relative to the same composition but in the absence of the diene-base compound, when tested according to SAE J1662 (issued June 1993) and/or ASHRAE 97-1983R standard tests. For example, in certain preferred embodiments, the amount of breakdown product, for example product formed by the substitution of hydrogen for iodine in the iodocarbon, is less than about 0.9 wt. % after the composition is maintained at about 300° F. for about two weeks.

In certain preferred embodiments, the diene-based compounds are present in the composition in amounts of from about 0.001% to about 10% by weight, more preferably from about 0.01 wt. % to about 5 wt. %, and even more preferably from about 0.3 wt. % to about 4 wt. %, based on the total weight of composition.

In preferred embodiments the diene-based compounds are selected from the group consisting of allyl ethers, propadiene, butadiene, isoprene, terpenes such as myrcene, terpene derivatives and combinations of any two or more of these. As used herein, each of the compounds identified in the immediately preceding list is intended to include both substituted and unsubstituted forms of the identified compounds. In certain preferred embodiments, the diene-based compounds comprise in major proportion, and even more preferably consist essentially of, propadiene.

In certain other preferred embodiments, the diene-based compounds comprise in major proportion, and even more preferably consist essentially of, terpenes, terpene derivatives or combinations of these. As used herein, the term "terpene" means a compound, which is comprised of at least ten carbon atoms and contains at least one, and preferably at least two isoprene moieties. In many preferred embodiments, the terpene compound of the present invention is formed from the reaction of at least two isoprene C5 units (CH2=C(CH3)—CH=CH2) (each unit being substituted or unsubstituted), and thus many of the terpene compounds of the present invention preferably have as at least 10 carbon atoms and include at least one isoprene moiety. As used herein, the term "isoprene moiety" refers to any portion of a molecule, which includes a radical, which can be formed from substituted or unsubstituted isoprene. In certain preferred embodiments, unsubstituted terpenes are preferred.

In many preferred embodiments, the terpene compound of the present invention comprises at least one head-to-tail condensation product of modified or unmodified isoprene molecules. It is contemplated that any one or more terpene compounds are adaptable for use in accordance with the present invention and that those skilled in the art will be able, in view of the teachings contained herein, to select the number and type of terpene compound(s) for any particular application without undue experimentation. The preferred terpenes of the present invention are hydrocarbons having molecular formula $(C_5H_8)_n$ in a cyclic or acyclic, saturated or unsaturated, substituted or unsubstituted structure, with n preferably being from 2 to about 6, and even more preferably 2 to 4. Terpenes according to the present invention having the formula $C_{10}H_{16}$ (including substituted forms) are sometimes referred to herein as monoterpenes, while terpenes having the formula $C_{15}H_{24}$ (including substituted forms) are sometimes referred to herein as sesquiterpenes. Terpenes according to the present invention having the formula $C_{20}H_{32}$ (including substituted forms) are sometimes referred to herein as diterpenes, while terpenes having the formula $C_{30}H_{48}$ (including substituted forms) are sometimes referred to as triterpenes, and so on. Terpenes containing 30 or more carbons are usually formed by the fusion of two terpene precursors in a regular pattern. While it is contemplated that all such terpenes are adaptable for use in accordance with the present invention, the use of monoterpenes is generally preferred.

In certain preferred embodiments, the terpene compound (s) of present compositions comprise, preferably in major proportion, and even more preferably consist essentially of, one or more acyclic terpene compounds. Among the acyclic terpenes, it is contemplated that such compounds may be within the class of compounds identified as head-to-tail linked isoprenoids or within the class of compounds that are not joined in that manner. Acyclic terpenes which are preferred for use in accordance with certain aspects of the present invention include myrcene (2-methyl-6-methyleneocta-1,7-diene), allo-cimene, beta-ocimene.

In certain embodiments, the terpene compounds of the present invention may comprise cyclic terpene compounds. Among the cyclic terpenes, mono-, bi-, tri-, or tetracyclic compounds having varying degrees of unsaturation are contemplated for use in accordance with the present invention.

Examples of terpene compounds adaptable for use in connection with the various aspects of the present invention include terebene, myrcene, limonene, retinal, pinene, menthol, geraniol, farnesol, phytol, Vitamin $A_1$, terpinene, delta-3 carene, terpinolene, phellandrene, fenchene, and the like, as well as blends thereof, including all their isomers.

Examples of terpene derivatives in accordance with the present invention include oxygen-containing derivatives of terpenes such as alcohols, aldehydes or ketones containing hydroxyl groups or carbonyl groups, as well as hydrogenated derivates. Oxygen-containing derivatives of terpenes are sometimes referred to herein as terpenoids. In certain embodiments, the diene-based compounds of the present invention comprise the terpenoid Carnosic acid. Carnosic acid is a phenolic diterpene that corresponds to the empirical formula C202804. It occurs naturally in plants of the Libiatae family. For instance, carnosic acid is a constituent of the species *Salvia officinalis* (sage) and *Rosmarinus officinalis* (rosemary) where it is mainly found in the leaves. Carnosic acid is also found in thyme and marjoram. It was discovered by Linde in *Salvia officinalis* [Helv. Chim Acta 47, 1234 (1962)] and by Wenkert et al. in *Rosmarinus officinalis* [J. Org. Chem. 30, 2931 (1965)]. It was then positively identified in various other species of sage, such as for example *Salvia canariensis* [Savona and Bruno, J. Nat. Prod. 46, 594 (1983)] or *Salvia willeana* [de la Torre et al., Phytochemistry 29, 668 (1990)]. It is also present in *Salvia triloba* and *Salvia sclarea*.

Any suitable relative amount of the at least one diene-based compound and supplemental optional stabilizer compound(s) may be used. For example, in certain preferred embodiments the weight ratio of the diene-based compound(s) to other stabilizer compound(s) is in the range of from about 1:99 to about 100:0. In more preferred embodiments, the weight ratio of diene-based compound(s) to the optional stabilizers is from about 10:1 to about 1:1, more preferably from about 2:1 to about 1:1, and even more preferably about 1:1.

Preferred terpene stabilizers are disclosed in U.S. Provisional Patent Application No. 60/638,003, filed on Dec. 12, 2004, which is incorporated herein by reference.

Any of a variety of phenol compounds and/or epoxides is also suitable for use as stabilizers in the present compositions. While applicants do not wish to be bound by or to any theory of operation, it is believed that the present phenols act as radical scavengers in the $CF_3I$ compositions and thereby tend to increase the stability of such compositions. As used herein the term "phenol compound" refers generally to any substituted or unsubstituted phenol. Examples of suitable phenol compounds include phenols comprising one or more substituted or unsubstituted cyclic, straight-chain, or branched aliphatic substituent group, such as, alkylated monophenols including: 2,6-di-tert-butyl-4-methylphenol; 2,6-di-tert-butyl-4-ethylphenol; 2,4-dimethyl-6-tert-butylphenol; tocopherol; and the like, hydroquinone and alkylated hydroquinones including: t-butyl hydroquinone; other derivatives of hydroquinone; and the like, hydroxylated thiodiphenyl ethers including: 4,4'-thiobis (2-methyl-6-tert-butylphenol); 4,4'-thiobis (3-methyl-6-tert-butylphenol); 2,2'-thiobis (4-methyl-6-tert-butylphenol); and the like, alkylidene-bisphenols including: 4,4'-methylenebis(2,6-di-tert-butylphenol); 4,4'-bis(2,6-di-tert-butylphenol; derivatives of 2,2- or 4,4-biphenyldiols; 2,2'-methylenebis(4-ethyl-6-tertbutylphenol); 2,2'-methylenebis(4-methyl-6-tert-butylphenol); 4,4,-butylidenebis(3-methyl-6-tert-butylphenol); 4,4,-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol), 2,2- or 4,4-biphenyldiols including 2,2'-methylenebis(4-ethyl-6-tertbutylphenol), butylated hydroxy toluene (BHT), bisphenols comprising heteroatoms including: 2,6-di-tert-.alpha.-dimethylamino-p-cresol; 4,4-thiobis(6-tert-butyl-m-cresol); and the like; acylaminophenols; 2,6-di-tert-butyl-4(N,N'-dimethylaminomethylphenol); sulfides including: bis(3-methyl-4-hydroxy-5-tert-butylbenzyl) sulfide; bis(3,5-di-tert-butyl-4-hydroxybenzyl)sulfide; and the like; as well as, phenolic UV absorb and light stabilizers. Certain preferred phenols include alkylated monophenols such as tocopherol, BHT, hydroquinones, and the like. Certain particularly preferred phenols include tocopherol, and the like. Most phenols are commercially available. A single phenol compound and/or mixtures of two or more phenols may be used in the present compositions. Any of a variety of epoxides are suitable for use in the compositions of the present invention. While applicants do not wish to be bound by or to any theory of operation, it is believed that the epoxides of the present invention act as acid scavengers, particularly in compositions containing iodocarbon compounds such as $CF_3I$ and thereby tend to increase the stability of such compositions. A single aromatic epoxide and/or mixtures of two or more aromatic epoxides may be used in the present compositions.

Examples of suitable aromatic epoxides include those defined by the formula I below:

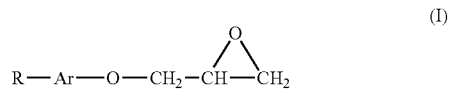

(I)

wherein: R is hydrogen, hydroxyl, alkyl, fluoroalkyl, aryl, fluoroaryl, or

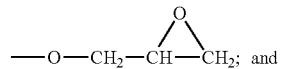

; and

Ar is a substituted or unsubstituted phenylene or napthylene moiety. Certain preferred aromatic epoxides of Formula I include those wherein Ar is phenylene or phenylene substituted with one or more substituents including alkyls, alkenyls, alkynyls, aryls, alkylaryls, halogens, halogenated alkyls, halogenated alkenyls, halogenated alkynyls, halogenated aryls, halogenated arylalkyls, hydroxyls, heteroatom moieties, and the like. Examples of suitable compounds of Formula I wherein Ar is an unsubstituted or substituted phenylene include butylphenylglycidyl ether; pentylphenylglycidyl ether; hexylphenylglycidyl ether; heptylphenylglycidyl ether; octylphenylglycidyl ether; nonylphenylglycidyl ether; decylphenylglycidyl ether; glycidyl methyl phenyl ether; 1,4-diglycidyl phenyl diether; 4-methoxyphenyl glycidyl ether; derivatives thereof; and the like.

Certain other preferred aromatic epoxides of Formula I include those wherein Ar is napthylene or napthylene substituted with one or more substituents including alkyls, alkenyls, alkynyls, aryls, alkylaryls, halogens, halogenated alkyls, halogenated alkenyls, halogenated alkynyls, halogenated aryls, halogenated arylalkyls, hydroxyls, heteroatom moieties, and the like. Examples of suitable compounds of Formula I wherein Ar is an unsubstituted or substituted napthylene include naphthyl glycidyl ether; 1,4-diglycidyl naphthyl diether; derivatives thereof; and the like.

Examples of other suitable aromatic epoxides include bisoxiranes, such as, 2,2'[[[5-heptadecafluorooctyl]1,3phenylene]bis[[2,2,2trifluoromethyl]ethylidene]oxymeth ylene] bisoxirane; and the like.

In certain preferred embodiments, the aromatic epoxides for use in the present invention comprise an epoxide of Formula I wherein Ar is phenylene, substituted phenylene, napthylene, or substituted napthylene. More preferably, the aromatic epoxides comprise an epoxide of Formula I wherein Ar is phenylene or substituted phenylene. Examples of certain more preferred aromatic epoxides include butylphenyl glycidyl ether, and the like.

Any of a variety of alkyl and/or alkenyl epoxides are suitable for use in the present compositions. Examples of suitable alkyl and alkenyl epoxides include those of Formula II:

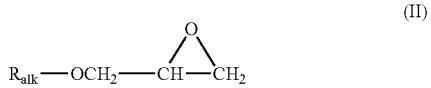

wherein $R_{alk}$ is a substituted or unsubstituted alkyl or alkenyl group. Certain preferred epoxides of Formula II comprise alkyl epoxide compounds wherein $R_{alk}$ is an alkyl group having from about 1 to about 10 carbon atoms, more preferably from about 1 to about 6 carbon atoms, and wherein the alkyl may be unsubstituted or further substituted with one or more substituents including alkyls, alkenyls, alkynyls, aryls, alkylaryls, halogens, halogenated alkyls, halogenated alkenyls, halogenated alkynyls, halogenated aryls, halogenated arylalkyls, hydroxyls, heteroatom moieties, and the like. Examples of such preferred alkyl epoxides of Formula II include n-butyl glycidyl ether, isobutyl glycidyl ether, hexanediol diglycidyl ether, and the like, as well as, fluorinated and perfluorinated alkyl epoxides, and the like. Certain more preferred alkyl epoxides comprise hexanediol diglycidyl ether, and the like.

Certain other preferred epoxides of Formula II comprise alkenyl epoxide compounds wherein $R_{alk}$ is an alkenyl group having from about 1 to about 10 carbon atoms, more preferably from about 1 to about 6 carbon atoms, and wherein the alkenyl may be unsubstituted or further substituted with one or more substituents including alkyls, alkenyls, alkynyls, aryls, alkylaryls, halogens, halogenated alkyls, halogenated alkenyls, halogenated alkynyls, halogenated aryls, halogenated arylalkyls, hydroxyls, heteroatom moieties, and the like. Examples of such preferred alkenyl epoxides of Formula II include allyl glycidyl ether, fluorinated and perfluorinated alkenyl epoxides, and the like. More preferred alkenyl epoxides include allyl glycidyl ether, and the like. A single alkyl epoxide or alkenyl epoxide and/or combinations of two or more thereof may be used in the present compositions.

In certain other preferred embodiments, the alkyl epoxide for use as an acid scavenger in the present composition comprises polypropylene glycol diglycidyl ether. Examples of polypropylene glycol diglycidyl ether suitable for use in the present invention includes the ether available commercially from SACHEM, Europe.

In addition, in certain embodiments, the epoxide for use in the present invention comprises combinations of two or more aromatic, alkyl, and/or alkenyl substituents. Such epoxides are referred to generally as "multisubstituted epoxides."

According to certain preferred embodiments, the stabilizer for use in the present invention comprises one or more diene-based compounds, preferably a terpene and/or a terpene-based compound. In certain embodiments the stabilizer comprises such diene-based compound(s) in combination with at least one phosphite compound, and/or at least one phenol compound and/or at least one aromatic, alkyl, or alkenyl epoxide. Examples of suitable combinations of phenols and epoxides include stabilizers comprising: tocopherol and allyl glycidyl ether, BHT and glycidyl butyl ether, and the like. Certain particularly preferred combinations include stabilizers comprising: tocopherol and allyl glycidyl ether, and the like. In certain embodiments the preferred stabilizers comprise at least one diene-based compound in combination with at least one phosphite compound.

Any suitable relative amount of the at least one phenol compound and the at least one aromatic, alkyl, or alkenyl epoxide may be used in the preferred stabilizers. For example, the weight ratio of phenol compound(s) to aromatic or fluorinated alkyl epoxide(s) can be varied from about 1:99 to about 99:1. In certain preferred embodiments, the weight ratios of phenol compound(s) to aromatic, alkyl, alkenyl, multisubstituted, or fluorinated alkyl epoxide(s) is from about 30 to about 1, more preferably from about 7 to about 1, more preferably from about 2 to about 1, and even more preferably about 1:1.

Any suitable effective amount of stabilizer may be used in the compositions of the present invention. As used herein, the term "effective stabilizing amount" refers to an amount of stabilizer of the present invention which, when added to a composition comprising trifluoroiodomethane, results in a stabilized composition wherein the trifluoroiodomethane therein degrades more slowly and/or to a lesser degree relative to the original composition, under the same, or similar, conditions. In certain preferred embodiments, an "effective stabilizing amount" of stabilizer comprises an amount which, when added to a composition comprising the degradable compound, such as the iodocarbon trifluoroiodomethane, results in a stabilized composition wherein the degradably compound degrades more slowly and/or to a lesser degree relative to the original composition under the conditions of at least one, or both, of the standards tests SAE J1662 (issued June 1993) and/or ASHRAE 97-1983R. In certain more preferred embodiments, an "effective stabilizing amount" of stabilizer comprises an amount which, when added to a composition comprising trifluoroiodomethane, results in a composition having a stability that is at least as good as, if not better, than the stability of a comparable composition comprising dichlorodifluoromethane (R-12) in mineral oil, under at least one of the standard tests SAE J1662 (issued June 1993) and/or ASHRAE 97-1983R. Certain preferred effective amounts of stabilizer for use in the present invention comprise from about 0.001 to about 10, more preferably from about 0.01 to about 5, even more preferably from about 0.3 to about 4 weight percent, and even more preferably from about 0.3 to about 1 weight percent based on the total weight of trifluoroiodomethane in the composition of the present invention.

In certain preferred embodiments, the compositions of the present invention further comprise a lubricant. Any of a variety of conventional and unconventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used. Examples of suitable lubricants, which are generally those commonly used in refrigeration machinery using or designed to use hydrofluorocarbon (HFC) refrigerants, chloroflurocarbon refrigerants and hydrochlorofluorocarbons refrigerants, include mineral oil, silicone oil, polyalkyl benzenes (sometimes referred to as PABs), polyol esters (sometimes referred to as POEs), polyalkylene glycols (sometimes referred to as PAGs), polyalkylene glycol esters (sometimes referred to as PAG esters), polyvinyl ethers (sometimes referred to as PVEs), poly(alpha-olefin) (sometimes referred to as PAOs), and halocarbon oils, particularly poly(chlorotrifluorethylene) and the like. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available polyalkyl benzene lubricants include Zerol 150 (registered trademark). Commercially available esters include neopentyl glycol dipelargonate which is available as Emery 2917 (registered trademark) and Hatcol 2370 (registered trademark). Commercially available PAGs include Motorcraft PAG Refrigerant Compressor Oil, available from Ford, with similar products being available from Dow. Commercially available PAOs include CP-4600 from CPI Engineering. Commercially available PVEs are available from Idemitsu Kosan. Commercially available PAG esters are available from Chrysler. Other useful esters include phosphate esters, dibasic acid esters, and fluoroesters.

For refrigeration systems using or designed to use HFCs, it is generally preferred to use as lubricants PAGs, PAG esters, PVEs, and POEs, particularly for systems comprising compression refrigeration, air-conditioning (especially for automotive air conditioning) and heat pumps. For refrigeration systems using or designed to use CFCs or HCFCs, it is generally preferred to use as lubricants mineral oil or PAB. In certain preferred embodiments, the lubricants of this invention are organic compounds which are comprised of carbon, hydrogen and oxygen with a ratio of oxygen to carbon and are included to provide, in combination with the amounts used, effective solubility and/or miscibility with the refrigerant to ensure sufficient return of the lubricant to the compressor. This solubility or miscibility preferably exists at at least one temperature from about $-30°$ C. and $70°$ C.

PAGs and PAG esters are highly preferred in certain embodiments because they are currently in use in particular applications such as original equipment mobile air-conditioning systems. Polyol esters are highly preferred in other certain embodiments because they are currently in use in particular non-mobile applications such as residential, commercial, and industrial air conditioning and refrigeration. Of course, different mixtures of different types of lubricants may be used.

Uses of the Compositions

The present compositions have utility in a wide range of applications. For example, included in the present invention are methods and compositions relating to heat transfer applications, foam and blowing agent applications, propellant applications, sprayable compositon applications, sterilaztion application, and others, comprising the present azeotrope-like compositions.

The heat transfer compositions of the present invention are generally adaptable for use in heat transfer applications, that is, as a heating and/or cooling medium. Although it is contemplated that the compositions of the present invention may include the present azeotrope-like composition in combination with one or more other compounds or combinations of compounds in widely ranging amounts, it is generally preferred that heat transfer compositions of the present invention, including refrigerant compositions, consist essentially of, and in some embodiments consist of the present azeotrope-like compositions.

The heat transfer compositions of the present invention may be used in any of a wide variety of refrigeration systems such as including air-conditioning (including both stationary and mobile air conditioning systems), refrigeration, heat-pump systems, and the like. In certain preferred embodiments, the compositions of the present invention are used in refrigeration systems originally designed for use with an HFC refrigerant, such as, for example, HFC-134a, or an HCFC refrigerant, such as, for example, HCFC-22. The preferred compositions of the present invention tend to exhibit many of the desirable characteristics of HFC-134a and other HFC refrigerants, including a GWP that is as low, or lower than that of conventional HFC refrigerants and a capacity that is as high or higher than such refrigerants and a capacity that is substantially similar to or substantially matches, and preferably is as high as or higher than such refrigerants. In particular, applicants have recognized that the present compositions tend to exhibit relatively low global warming potentials ("GWPs"), preferably less than about 1000, more preferably less than about 500, and even more preferably less than about 150. In addition, the relatively constant boiling nature of the compositions of the present invention makes them even more desirable than certain conventional HFCs, such as R-404A or combinations of HFC-32, HFC-125 and HFC-134a (the combination HFC-32:HFC-125:HFC134a in approximate 23:25:52 weight ratio is referred to as R-407C), for use as refrigerants in many applications. Heat transfer compositions of the present invention are particularly preferred as replacements for HFC-134, HFC-152a, HFC-22, R-12 and R-500.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, polyalkylbenzene, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers (including chillers using centrifugal compressors), transport refrigeration systems, commercial refrigeration systems and the like.

Many existing refrigeration systems are currently adapted for use in connection with existing refrigerants, and the compositions of the present invention are believed to be adaptable for use in many of such systems, either with or without system modification. In many applications the compositions of the present invention may provide an advantage as a replacement in smaller systems currently based on certain refrigerants, for example those requiring a small refrigerating capacity and thereby dictating a need for relatively small compressor displacements. Furthermore, in embodiments where it is desired to use a lower capacity refrigerant composition of the present invention, for reasons of efficiency for example, to replace a refrigerant of higher capacity, such embodiments of the present compositions provide a potential advantage. Thus, it is preferred in certain embodiments to use compositions of the present invention, particularly compositions comprising a substantial proportion of, and in some embodiments consisting essentially of the present azeotrope-like compositions, as a replacement for existing refrigerants, such as: HFC-134a; CFC-12; HCFC-22; HFC-152a; combinations of pentfluoroethane (HFC-125), trifluorethane (HFC-143a) and tetrafluoroethane (HFC-134a) (the combination HFC-125:HFC-143a:HFC134a in approximate 44:52:4 weight ratio is referred to as R-404A); combinations of HFC-32, HFC-125 and HFC-134a (the combination HFC-32:HFC-125:HFC134a in approximate 23:25:52 weight ratio is referred to as R-407C); combinations of methylene fluoride (HFC-32) and pentfluoroethane (HFC-125) (the combination HFC-32:HFC-125 in approximate 50:50 weight ratio is referred to as R-410A); the combination of CFC-12 and 1,1-difluorethane (HFC-152a) (the combination CFC-12:HFC-152a in a 73.8:26.2 weight ratio is referred to R-500); and combinations of HFC-125 and HFC-143a (the combination HFC-125: HFC143a in approximate 50:50 weight ratio is referred to as R-507A). In certain embodiments it may also be beneficial to use the present compositions in connection with the replacement of refrigerants formed from the combination HFC-32: HFC-125:HFC134a in approximate 20:40:40 weight ratio, which is referred to as R-407A, or in approximate 15:15:70 weight ratio, which is referred to as R-407D. The present compositions are also believed to be suitable as replacements for the above noted compositions in other applications, such as aerosols, blowing agents and the like.

In certain applications, the refrigerants of the present invention potentially permit the beneficial use of larger displacement compressors, thereby resulting in better energy efficiency than other refrigerants, such as HFC-134a. Therefore the refrigerant compositions of the present invention provide the possibility of achieving a competitive advantage on an energy basis for refrigerant replacement applications.

It is contemplated that the compositions of the present also have advantage (either in original systems or when used as a replacement for refrigerants such as CFC-12, HCFC-22, HFC-134a, HFC-152a, R-500 and R-507A), in chillers typically used in connection with commercial air conditioning and refrigeration systems. In certain of such embodiments it is preferred to including in the present compositions from about 0.5 to about 30% of a supplemental flammability suppressant, and in certain cases more preferably 0.5% to about 15% by weight and even more preferably from about 0.5 to about 10% on a weight basis. In this regard it is noted that the certain of HFO-1234 and/or HFO-1225 components of the present compositions may in certain embodiments act as flammability suppressants with respect to other components in the composition. Thus, components other than HFO1234 and HFO-1225 which have flammability suppressant functionality in the composition will sometimes be referred to herein as a supplemental flammability suppressant.

In certain embodiments, co-refrigerants, including for example HFCs, HCFCs and CFCs may be included in the heat transfer compositions of the present invention, including one or more of the following, including any and all isomers thereof:

Trichlorofluoromethane (CFC-11)
Dichlorodifluoromethane (CFC-12)
Difluoromethane (HFC-32)
Pentafluoroethane (HFC-125)
1,1,2,2-tetrafluoroethane (HFC-134)
1,1,1,2-Tetrafluoroethane (HFC-134a)
Difluoroethane (HFC-152a)
1,1,1,2,3,3,3-Heptafluoropropane (HFC-227ea)
1,1,1,3,3,3-hexafluoropropane (HFC-236fa)
1,1,1,3,3-pentafluoropropane (HFC-245fa)
1,1,1,3,3-pentafluorobutane (HFC-365mfc)
water
$CO_2$ The relative amount of any of the above noted components, as well as any additional components which may be included in present compositions, may be incorporated into the present composition in amounts depending on the particular application for the composition, and all such relative amounts are considered to be within the scope hereof, provided preferably that such components do not negate the azeotrope-like nature of the HFO-1234 and HFO-1225 described herein.

The present methods, systems and compositions are thus adaptable for use in connection with automotive air conditioning systems and devices, commercial refrigeration systems and devices, chillers (including systems which utilize centrifugal compressors), residential refrigerator and freezers, general air conditioning systems, heat pumps, and the like.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling, including cooling of other fluid either directly or indirectly or a body directly or indirectly, comprise condensing a refrigerant composition comprising an azeotrope-like composition of the present invention and thereafter evaporating said refrigerant composition in the vicinity of the article to be cooled. As used herein, the term "body" is intended to refer not only to inanimate objects but also to living tissue, including animal tissue in general and human tissue in particular. For example, certain aspects of the present invention involved application of the present composition to human tissue for one or more therapeutic purposes, such as a pain killing technique, as a preparatory anesthetic, or as part of a therapy involving reducing the temperature of the body being treated. In certain embodiments, the application to the body comprises providing the present compositions in liquid form under pressure, preferably in a pressurized container having a one-way discharge valve and/or nozzle, and releasing the liquid from the pressurized container by spraying or otherwise applying the composition to the body. As the liquid evaporates from the surface being sprayed, the surface cools.

Certain preferred methods for heating a fluid or body comprise condensing a refrigerant composition comprising an azeotrope-like composition of the present invention in the vicinity of the the fluid or body to be heated and thereafter evaporating said refrigerant composition. In light of the disclosure herein, those of skill in the art will be readily able to heat and cool articles according to the present inventions without undue experimentation.

Applicants have found that in the systems of the present invention many of the important refrigeration system performance parameters are relatively close to the parameters for R-134a. Since many existing refrigeration systems have been designed for R-134a, or for other refrigerants with properties similar to R-134a, those skilled in the art will appreciate the substantial advantage of a low GWP and/or a low ozone depleting refrigerant that can be used as replacement for R-134a or like refrigerants with relatively minimal modifications to the system. It is contemplated that in certain embodiments the present invention provides retrofitting methods which comprise replacing the refrigerant in an existing system with a composition of the present invention, without substantial modification of the system. In certain preferred embodiments the replacement step is a drop-in replacement in the sense that no substantial redesign of the system is required and no major item of equipment needs to be replaced in order to accommodate the refrigerant of the present invention. In certain preferred embodiments, the methods comprise a drop-in replacement in which the capacity of the system is at least about 70%, preferably at least about 85%, and even more preferably at least about 90% of the system capacity prior to replacement. In certain preferred embodiments, the methods comprise a drop-in replacement in which the suction pressure and/or the discharge pressure of the system, and even more preferably both, is/are at least about 70%, more preferably at least about 90% and even more preferably at least about 95% of the system capacity prior to replacement. In certain preferred embodiments, the methods comprise a drop-in replacement in which the mass flow of the system is at least about 80%, and even more preferably at least 90% of the system capacity prior to replacement.

In another embodiment, the azeotrope-like compositions of this invention may be used as propellants in sprayable compositions, either alone or in combination with known propellants. The propellant composition comprises, more preferably consists essentially of, and, even more preferably, consists of the azeotrope-like compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleaning solvents, and lubricants, as well as medicinal materials such as anti-asthma medications. The term medicinal materials is used herein in its broadest sense to include any and all materials which are, or at least are believe to be, effective in connection with therapeutic, diagnostic, pain relief, and similar treatments, and as such would include for example drugs and biologically active substances.

Yet another embodiment of the present invention relates to a blowing agent comprising one or more azeotrope-like compositions of the invention. In general, the blowing agent may include the azeotrope-like compositions of the present invention in widely ranging amounts. It is generally preferred, however, that the blowing agents comprise the present azeotrope-like compositions in amounts of at least about 5% by weight, and even more preferably at least about 15% by weight, of the blowing agent. In certain preferred embodiments, the blowing agent comprises at least about 50% by weight of the present azeotrope-like compositions, and in certain embodiments the blowing agent consists essentially of the present azeotrope-like composition. In certain preferred embodiments, the blowing agent includes, in addition to the present compositions, one or more of co-blowing agents, fillers, vapor pressure modifiers, flame suppressants, stabilizers and like adjuvants.

In other embodiments, the invention provides foamable compositions. The foamable compositions of the present invention generally include one or more components capable of forming foam having a generally cellular structure and a blowing agent in accordance with the present invention. In certain embodiments, the one or more components comprise a thermosetting composition capable of forming foam and/or foamable compositions. Examples of thermosetting compositions include polyurethane and polyisocyanurate foam compositions, and also phenolic foam compositions. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure. In certain other embodiments, the one or more components comprise thermoplastic materials, particularly thermoplastic polymers and/or resins. Examples of thermoplastic foam components include polyolefins, such as polystyrene (PS), polyethylene (PE), polypropylene (PP) and polyethyleneterepthalate (PET), and foams formed there from, preferably low-density foams. In certain embodiments, the thermoplastic foamable composition is an extrudable composition.

It will be appreciated by those skilled in the art, especially in view of the disclosure contained herein, that the order and manner in which the blowing agent of the present invention is formed and/or added to the foamable composition does not generally affect the operability of the present invention. For example, in the case of extrudable foams, it is possible that the various components of the blowing agent, and even the components of the present composition, be not be mixed in advance of introduction to the extrusion equipment, or even that the components are not added to the same location in the extrusion equipment. Thus, in certain embodiments it may be desired to introduce one or more components of the blowing agent at first location in the extruder, which is upstream of the place of addition of one or more other components of the blowing agent, with the expectation that the components will come together in the extruder and/or operate more effectively in this manner. Nevertheless, in certain embodiments, two or more components of the blowing agent are combined in advance and introduced together into the foamable composition, either directly or as part of premix which is then further added to other parts of the foamable composition.

The invention also relates to foam, and preferably closed cell foam, prepared from a polymer foam formulation containing a composition of the invention, preferably as part of blowing agent.

In certain preferred embodiments, dispersing agents, cell stabilizers, surfactants and other additives may also be incorporated into the blowing agent compositions of the present invention. Surfactants are optionally but preferably added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458, each of which is incorporated herein by reference. Other optional additives for the blowing agent mixture may include flame retardants or suppressants such as tri(2-chloroethyl)phosphate, tri(2-chloropropyl) phosphate, tri(2,3-dibromopropyl)-phosphate, tri(1,3-dichloropropyl) phosphate, diammonium phosphate, various halogenated aromatic compounds, antimony oxide, aluminum trihydrate, polyvinyl chloride, and the like.

Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

Other uses of the present azeotrope-like compositions include use as solvents, cleaning agents, and the like. Those of skill in the art will be readily able to adapt the present compositions for use in such applications without undue experimentation.

EXAMPLE

The invention is further illustrated in the following example which is intended to be illustrative, but not limiting in any manner.

Example 1

An ebulliometer consisting of vacuum jacketed tube with a condenser on top which is further equipped with a Quartz Thermometer K96S4771 is used. About 17 g HFO-1234yf is charged to the ebulliometer and then HFO-1225yeZ is added in small, measured increments. Temperature depression is observed when HFO-1225yeZ is added to HFO-1234yf, indicating a binary minimum boiling azeotrope is formed. From greater than 0 to about 50 weight percent HFO-1225yeZ, the boiling point of the composition changed by about 3° C. or less. The binary mixtures shown in Table 1 were studied and the boiling point of the compositions changed by about 3° C. or less. The compositions exhibit azeotrope and/or azeotrope-like properties over this range.

TABLE 1

HFO-1234yf/HFO-1225yeZ compositions at 14.2 psia

| Wt. % HFO-1234yf | Wt. % HFO-1225yeZ | Temperature (° C.) |
|---|---|---|
| 100.00 | 0.00 | −28.863 |
| 96.57 | 3.43 | −29.108 |
| 93.58 | 6.42 | −28.765 |
| 88.25 | 11.75 | −28.588 |
| 80.94 | 19.06 | −28.372 |
| 73.76 | 26.24 | −27.989 |
| 66.59 | 33.41 | −27.684 |
| 55.74 | 44.26 | −26.803 |
| 50.50 | 49.50 | −26.214 |
| 47.40 | 52.60 | −25.870 |

What is claimed is:

1. A method of replacing an existing refrigerant contained in a refrigerant system comprising removing at least a portion of said existing refrigerant from said system and replacing at least a portion of said existing refrigerant by introducing into said system a refrigerant composition comprising an azeotrope-like composition comprising effective amounts of HFO-1234yf and HFO-1225yez.

2. The method of claim 1 wherein said existing refrigerant is selected from the group consisting of HFC-134a, R-12, R-500, HFC-152a, and HFC-22 and combinations of these.

3. The method of claim 1 wherein said existing refrigerant is selected from the group consisting of HFC-134a, HFC-143a, HFC-125, HFC-32 and combinations of these.

4. The method of claim 1 wherein said existing refrigerant is selected from the group consisting of HFC-143a, HFC-125, HFC-32 and combinations of these.

5. The method of claim 1 wherein said existing refrigerant system is selected from the group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, heat pump systems, and combinations of two or more of these.

6. The method of claim 1 wherein said refrigerant introduced into said system has a Global Warming Potential (GWP) of not greater than about 1000.

7. The method of claim 1 wherein said azeotrope-like composition consists essentially of from about 50 to less than 100 weight percent HFO-1234yf and from greater than zero to about 50 weight percent of HFO-1225yeZ.

8. The method of claim 1 wherein said azeotrope-like composition consists essentially of from about 65 to less than 100 weight percent HFO-1234yf and from greater than zero to about 35 weight percent of HFO-1225yeZ.

9. The method of claim 1 wherein said azeotrope-like composition consists essentially of from about 85 to less than 100 weight percent HFO-1234yf and from greater than zero to about 15 weight percent of HFO-1225yeZ.

10. The method of claim 1 wherein said azeotrope-like composition consists essentially of from about 93 to less than 100 weight percent HFO-1234yf and from greater than zero to about 7 weight percent of HFO-1225yeZ.

11. The method of claim 1 wherein said azeotrope-like composition has a boiling point of from about −26° C. to about −30° C. at a pressure of about 14.2 psia.

12. The method of claim 1 wherein said azeotrope-like composition has a boiling point of from about −27° C. to about −30° C. at a pressure of about 14.2 psia.

13. The method of claim 1 wherein said azeotrope-like composition has a boiling point of from about −28° C. to about −29.5° C. at a pressure of about 14.2 psia.

14. The method of claim 1 wherein said refrigerant introduced into said system further comprises at least one adjuvant selected from the group consisting of supplemental lubricants, compatibilizers, surfactants, supplemental flame suppressants, solubilizing agents, dispersing agents, cell stabilizers, cosmetics, polishing agents, medicaments, cleaners, fire retarding agents, colorants, chemical sterilants, stabilizers, polyols, polyol premix components and combinations of two or more of these.

15. The method of claim 14 wherein said adjuvant is a stabilizer comprising at least one compound selected from the group consisting of C3-C5 dienes or derivatives thereof, phenols, aromatic epoxides, alkyl epoxides, and alkenyl epoxides.

16. The method of claim 14 wherein said adjuvant is a lubricant comprising at least one compound selected from the group consisting of mineral oil, polyalkylene glycol, polyalkylene glycol ester, polyvinyl ethers, and polyol esters.

17. The method of claim 14 wherein said adjuvant is a lubricant selected from the group consisting of polyalkylene glycol, polyalkylene glycol ester, and combinations thereof.

18. The method of claim 1 wherein said refrigerant system is selected from automotive air conditioning systems and transport refrigeration systems.

19. The method of claim 1 wherein said refrigerant introduced into said system is a drop-in replacement for said existing refrigerant.

20. The method of claim 19 wherein said drop-in replacement has a refrigeration capacity of at least about 90% of said existing refrigerant.

* * * * *

UNITED STATES PATENT AND TRADEMARK OFFICE
CERTIFICATE OF CORRECTION

PATENT NO. : 7,605,117 B2 Page 1 of 1
APPLICATION NO. : 11/109190
DATED : October 20, 2009
INVENTOR(S) : Wilson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 457 days.

Signed and Sealed this

Fifth Day of October, 2010

David J. Kappos
*Director of the United States Patent and Trademark Office*